June 15, 1965  W. L. BURKHARDT  3,188,889
CIRCULAR SAW HOLDING JIG
Filed Sept. 30, 1963
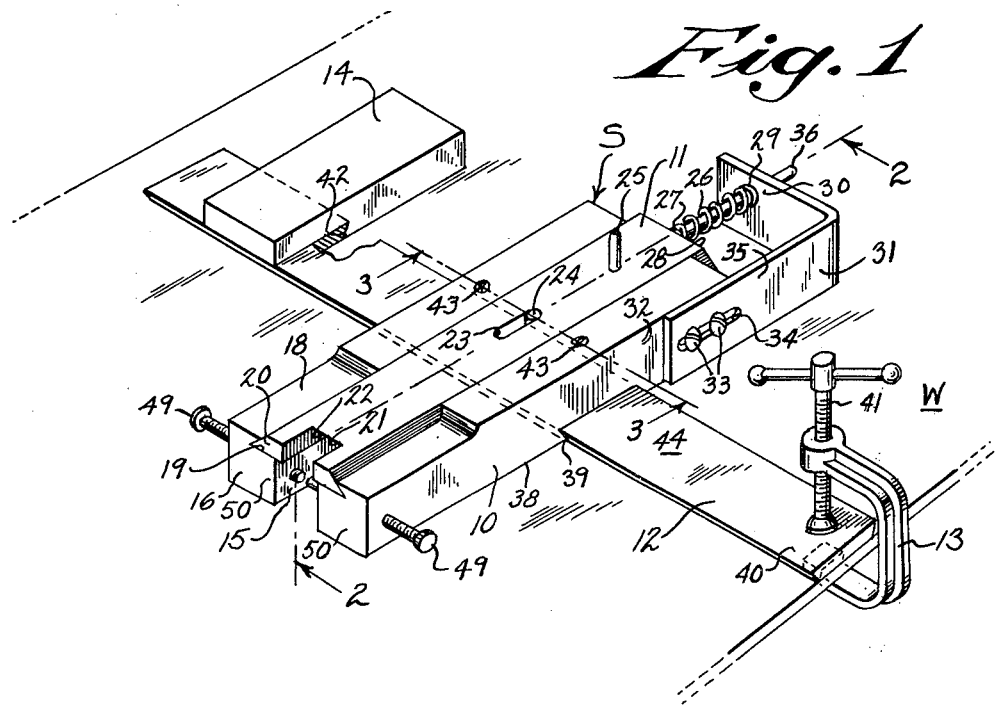
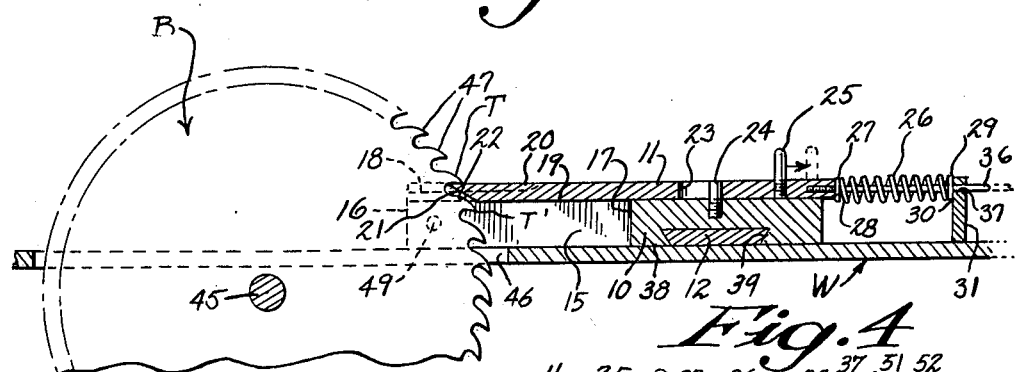
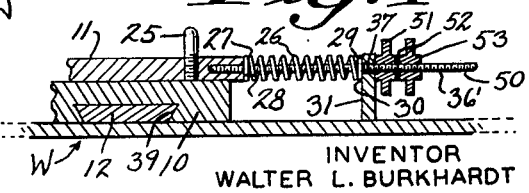
INVENTOR
WALTER L. BURKHARDT
BY *George H. Wright*
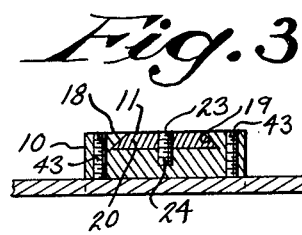

United States Patent Office 3,188,889
Patented June 15, 1965

3,188,889
CIRCULAR SAW HOLDING JIG
Walter L. Burkhardt, 1215 Georgia Ave., Sheboygan, Wis.
Filed Sept. 30, 1963, Ser. No. 312,588
6 Claims. (Cl. 76—78)

This invention appertains to filing and sharpening the teeth of circular saws, and more particularly to new and useful improvements in a device for holding the saw so that the teeth can be uniformly filed, sharpened or set as desired.

In all known prior devices utilized for filing and sharpening teeth of various types of circular saws, the saw blade is first removed from the machine and then secured to a shaft or chuck of the device used for working on the teeth. It would be highly desirable to be able to dress and work on the teeth of the saw while the saw blade is still on its own shaft. This is due to the fact that the teeth then could be uniformly dressed in direct relation to the axial center of the shaft of the wood or metal working machine.

It is, therefore, a primary object of my present invention to provide a device which can be associated with the work table or surface of the wood working machine to hold each tooth of the saw in the same relative position as it is being worked upon, without the necessity of removing the saw from its shaft.

Another object of my present invention is to provide a novel device which can be secured to the work table of the saw machine in such a manner as to enable the filing and sharpening of all types of circular saws, such as planer saws, raker tooth saws etc. regardless of the size, shape and configuration of the teeth.

A further object of my present invention is to provide a device which will hold the saw blade in such a manner that all of the teeth can be conditioned and dressed to the same length and sharpened evenly so that the saw will make a perfect cut.

Still another object of my present invention is to provide a device which will enable the filing and sharpening of the teeth of circular saw blades, while the blade hangs on its own shaft, thus guaranteeing that the teeth will be uniformly sharpened in relation to the axial center of the shaft.

A further object of my present invention is to provide a novel slide member for properly positioning the tooth to be worked upon and in providing novel fine adjusting means for the slide to assure the proper positioning of the slide wall and tooth and to thus limit the sliding movement thereof.

A salient feature of my present invention resides in providing a novel device for holding a circular saw blade in such a manner that the points of the teeth of the circular saw blade will be all located on a single circle.

A further object of my invention is to provide a simple, practical and reliable construction that is economical to manufacture, easy to assemble and positive in its operation.

With these and other objects in view, which will more readily appear as the nature of the invention is better understood, the same consists in the novel construction, combination and arrangement of parts, hereinafter more fully described, illustrated and claimed. A preferred and practical embodiment of my invention is shown in the accompanying drawings, in which:

FIGURE 1 is a top elevational view in perspective, showing my novel device secured to the work table or surface of the wood or metal working machine;

FIGURE 2 is a longitudinal vertical section taken through the device, the section being represented by the lines 2—2 of FIG. 1, looking in the direction of the arrows, the circular saw blade being shown in position for work upon one of its teeth;

FIGURE 3 is a transverse vertical section taken on the line 3—3 of FIG. 1, looking in the direction of the arrows, and FIGURE 4 is a fragmentary longitudinal vertical section similar to FIGURE 2, but illustrating a modified means for limiting the sliding movement of the slide and for obtaining the initial fine adjustment thereof.

Referring now to the drawings in detail, wherein similar reference characters designate corresponding parts throughout the several views, the letter S generally indicates one type of my improved device for holding the blade B of a circular saw in position so that a tooth T thereof can be filed and sharpened, as desired. This includes broadly a base member 10 carrying a slide 11 and a cross-bar 12 utilized to secure the same to the work table W, by means of the clamp 13 and a magnet 14. The base 10 can be made of any desired material, but is preferably cast from a metal block the front end of which is provided with an elongated open slot 15. This slot 15 extends from the front surface 16 to approximately the center 17 of the block or base 10. The upper surface 18 of this block or base 10 is provided with the female portion of a dovetail slot 19 and this dovetail slot 19 extends the entire longitudinal length of the block. The slide 11 is correspondingly formed with the male portions 20 of the dovetail and thus is received within the base or block 10 for movement longitudinally in relation thereto. The forward end of the slide 11 is provided with an open slot 21. The slot 21 overlies the larger slot or opening 15 formed in the base 10 and the rear wall 22 is beveled, preferably at an angle of between 30 to 35 degrees. The reason for this angle will become more apparent as the description proceeds. Slide 11 is also provided with an elongated opening 23 through which a stop pin 24 secured to the base 10 extends. Thus, the opening 23 in cooperation with the pin 24 provides a limit for the longitudinally moving slide 11. To facilitate the movement of the slide 11, I provide a handle in the form of a vertically extending pin 25, as shown. In order to constantly urge the slide 11 toward its forward limitation against the stop pin 24, I provide a spring 26 having one end 27 contacting the rear wall 28 of the slide 11 and its other end 29 contacting the wall 30 of an L-shaped bracket 31 which is in turn, adjustably secured to the side 32 of the block 10 by the screws 33. These screws 33, as shown, extend through the elongated slot 34 formed in the wall 35 of the bracket 31. Obviously, to keep the spring 26 in its proper position, I provide a guide bar 36, which extends through the spring 26 and through an opening 37 in the wall 30 of the bracket 31. The other end of this guide bar is threadedly received in the wall 28 of the slide 11.

In order to adjustably secure the base 10 to the work table W, I provide the aforementioned cross-bar 12 and it should be noted that it is fitted in the bottom wall 38 of the block or base 10 by utilizing a dovetail 39, as shown. Thus, the base 10 can be moved transversely of the work table and located adjacent the saw blade B as desired. Any type of clamp can be utilized to secure one end 40 of the bar 12 to the table, and I have shown and described a standard U-clamp 13 which includes the usual threaded member 41 and which can be tightened to the end 40 and firmly secure the bar to its work surface. The other end of the bar is provided with the aforementioned magnet 14 and the under surface of the magnet 14 is provided with an under-cut and bevel 42 to receive the male portion of the dovetail in the bar 12. Thus, it can be seen that my device can be firmly held to the work table of any conventional type of wood or metal working saw machine. Also, the block 10 can be moved transversely of the table and adjusted and aligned with the saw blade. In order to secure the block 10 against transverse movement, I provide two set screws 43 which can be tightened against the upper surface 44 of the bar 12 to hold the base in its adjusted desired position.

As previously brought out, my device can be utilized with any size circular saw and with any shape or configuration of the teeth, and can be utilized with saws that are held both above and below the work table.

For purposes of illustration, however, I have shown a saw of the planer type, wherein the shaft 45 for the blade B of the saw is located below the work surface of the table W, and the circular blade extends upwardly through a slot 46 provided for this purpose. In explaining the operation of the device attention is directed primarily to FIGURE 2 of the drawings, and it will be assumed that the planer teeth 47 of the blade B are to be filed and sharpened. Therefore, the device S is placed on the work table and the base 10 moved forwardly until the saw blade is received in the slot 15 of the base 10 and the slot 21 of the slide 11. The slide 11 is constantly urged in its forward position by the spring 26 and the base is moved into position until a tooth T rests on the upper surface 48 of the slide 11 and against the bevel 21. The set screws 43 are then tightened to hold the base firmly in relation to the bar 12 and to further steady the blade B, I provide a pair of adjusting screws 49 which extend through the portions 50 of the block 10 and in to the slot or opening 15. These adjusting screws obviously extend from opposite sides, as shown, and engage opposite sides of the saw blade B to steady the saw which is to be worked upon. The reason for the angle in the bevel 21 of the slide 11 is now readily apparent, particularly in FIGURE 2 of the drawings. The tooth T rests on the upper surface of the bevel 21 and the next lower adjacent tooth T' extends under the slide 11 and thus, the angle of the bevel 21 is such as to accommodate the tooth T'. After the tooth T has been dressed, i.e., filed or sharpened, the adjusting screws 49 are loosened slightly, slide 11 is retracted by pulling the handle 25 rearwardly against the tension of the spring 26 from its full line position to its dotted line position, as shown, and the blade is then rotated so that the tooth above tooth T contacts the upper surface 48 of the slide 11 and bevel 21. The slide is then released, the adjusting screws tightened and the next tooth is in position to be filed and/or sharpened. This process is repeated until all of the teeth 47 have been properly dressed, and it is obvious that inasmuch as each tooth is held in the same relative position that the work will be performed uniformly and also, inasmuch as the saw blade B hangs on its original shaft 45, the work will be in direct relation to the axial center and manner in which the saw hangs on the machine.

Any type of filing, or grinding tool, or dressing tool can be used with my device, and any means can be provided to hold the tools in uniform positions. I have found, however, that with my device the saws can be filed by hand and the work accomplished in a uniform manner that heretofore has been impossible.

While I have found that slot 23 and stop pin 24 provide a relatively simple means for limiting the longitudinal sliding movement of the slide 11, it would be desirable to have a finer adjustment for the slide 11 and thus, in FIGURE 4 of the drawings, I have illustrated a preferred fine adjustment for limiting in particular the forward movement of the slide 11. In this form of the invention, the structure of the base 10 and slide 11 and other elements of the device are substantially the same except that I eliminate stop pin 24 secured to the base 10 and the longitudinal extending slot 23 in the slide.

The reason for this will become apparent as the description proceeds. In any event, slide 11 is provided with the handle 25 as shown, and the L-shaped bracket 31 is secured as illustrated in FIGURE 1 of the drawings. Spring 26 is the same and is positioned between the wall 30 of bracket 31 and the rear wall of the slide 11 in the usual manner. In this modification, I provide a guide pin 36' which is substantially longer than guide pin 36 and is provided with external threads. Particularly, the extended end portion 50 thereof must be threaded as shown. Guide pin 36' is slidably received through the aperture 37 in the wall 30 and threaded on the outer end 50 thereof is an adjusting and stop nut 51, a lock washer 52 and a jam nut 53. The lock washer 52 is provided with a smooth bore and preferably is splined to the end 50 so that the nut slides along the end 50 but does not rotate. Thus, it can be seen that the adjusting and stop nut 51 abuts the outer surface of the wall 30 and will limit the forward sliding movement of the slide 11. This form of the invention has particular advantage, in that, the base 10 with the slide 11 in the position shown in FIGURES 2 and 4 of the drawings, can be positioned adjacent the blade B with one of the teeth T resting on the beveled wall 22. The crossbar 12 can then be secured to the work table W and the jam nut 53, as well as the adjusting and stop nut 51 are threaded toward the outer end of the end 50 and the slide 11 is allowed to seat in proper position in relation to the tooth to be worked upon. The adjusting and stop nut 51 is then moved up against the outer surface of the wall 30 and the jam nut securely turned to engage the washer 52 and the nuts are firmly held against rotation and the proper adjustment secured. It should also be noted that when the device is in the position shown in FIGURE 2 of the drawings, that the work table and blade B may be adjusted relative one to the other, so that the upper surface of the tooth which is to be worked upon is in a substantially flat plane. This assures the uniform sharpening where a hand file is used.

From the foregoing, it can be seen that I have provided a very versatile device for holding the blades of circular saws steady, while work is being performed upon the teeth in such a manner as to accomplish uniform sharpening and filing, and in such a manner that the work is accomplished while the blade is in its working position on the shaft 45. It is also believed that the features and advantages of my invention will be readily apparent to those skilled in the art, and it will, of course, be understood that changes in the form, proportion and minor details of construction may be resorted to without departing from the spirit of the invention or scope of the appended claims.

What I claim as new is:

1. A device to be supported on the work surface of a circular blade saw machine for holding the saw blade while the blade is in position on its shaft to facilitate the filing and sharpening of the teeth in a uniform manner, comprising a substantially rectangular shaped base having front, rear, top, bottom and side walls, said front, top and bottom walls having formed therein a base slot opening out on said front wall, said slot extending for a substantial longitudinal distance into said base and having a thickness substantially greater than the thickness of said blade, a longitudinally extending slide slidably received in said top wall and having one end overlying said base slot, said end of said slide having a correspondingly formed open ended slide slot therein above said base slot, said slide slot being of lesser over-all dimensions than said base slot and having a thickness greater than the thickness of said blade, the inner wall of said slide slot extending rearwardly and downwardly at an angle to form a beveled upper edge, means limiting the sliding movement of said slide in relation to said base, means continually urging said slide forwardly, means associated with said base slot for holding said blade against rotation when said base is positioned adjacent said blade with the outer toothed peripheral edge of said blade being received within said slots, the beveled wall of said slide slot normally being in engagement with a tooth of said blade, means for retracting said slide rearwardly and moving said inner beveled wall out of engagement with a tooth of said circular blade, a transversely extending cross-bar slidably received in dovetail relation with the bottom wall of said base, means for holding said cross-bar firmly to the work surface, and means adjustably holding said base to said cross-bar in any desired position, whereby said base can be aligned adjacent said circular saw blade as indicated regardless of the position of the blade in relation to its work surface.

2. A device as set forth in claim 1, wherein said means for limiting the sliding movement of said slide in relation to the base includes a centrally located elongated opening in said slide and a stop pin in said opening and secured to said base.

3. A device as set forth in claim 1, wherein said means for holding said cross-bar firmly to the work surface includes a U-shaped clamp adapted to secure the bar and one edge of the work surface together, and a magnet overlapping said bar and associated with the opposite end of said bar.

4. A device as set forth in claim 1, wherein said means for limiting the sliding movement of the slide and said means constantly urging said slide forwardly include, an L-shaped bracket secured to a side wall of said base adjacent the rear portion thereof, said bracket having one leg spaced from and extending parallel with the rear wall of said base, a threaded guide pin projecting rearwardly from said slide and through an aperture formed in said bracket leg, said threaded guide pin having an end portion terminating well beyond said bracket leg, a spring about said guide pin between said slide and parallel bracket leg constantly urging said slide in a forward direction, an adjusting and stop nut threaded on said extended end of said guide pin and adapted to engage a wall of said bracket leg, a jam nut, and a lock washer between said nuts to prevent rotation of the adjusting and stop nut in any adjusted position.

5. A device as set forth in claim 1, wherein said means constantly urging said slide forwardly and said means for retracting said slide include, an L-shaped bracket secured to a side wall of said base adjacent the rear end thereof, said bracket having one leg spaced from and extending parallel with the rear wall of said base, a guide pin projecting rearwardly from said slide, and a spring about said guide pin between said slide and parallel extending bracket leg constantly urging said slide in a forward direction, and a handle for retracting the slide against the force of the spring.

6. A bracket as set forth in claim 5, wherein one leg of said bracket is adjustably secured to said side wall.

References Cited by the Examiner
UNITED STATES PATENTS
288,767   11/83   Bradley _____ 76—78

FRANK E. BAILEY, *Primary Examiner.*
GRANVILLE Y. CUSTER, Jr., *Examiner.*